United States Patent [19]

Toda et al.

[11] E Re. 30,933

[45] Reissued May 18, 1982

[54] APPARATUS FOR CONTINUOUS TREATMENT OF LOW-CARBON COLD-ROLLED STEEL SHEET HAVING EXCELLENT COLD WORKING PROPERTIES

[75] Inventors: Kenzo Toda; Hisashi Gondo, both of Tokyo; Bunichiro Kawasaki, Hikari; Mitsunobu Abe, Tokyo; Ryoseki Katsutani, Kisarazu; Tsuyoshi Kawano, Kitakyushu; Norimasa Uehara, Kimitsu; Yoshio Saito, Futtsu; Kenichiro Suemune, Kitakyushu; Masahiko Shiraishi, Nakatsu; Yoshifumi Tadashige, Kisarazu; Masao Morimoto, Yokohama; Takao Tsukamura, Funabashi; Kurayoshi Watanabe, Tokyo; Teruhiko Nishimura, Kisarazu, all of Japan

[73] Assignee: Nippon Steel Corporation, Tokyo, Japan

[21] Appl. No.: 125,750

[22] Filed: Feb. 28, 1980

Related U.S. Patent Documents

Reissue of:

[64] Patent No.: 3,805,571
Issued: Apr. 23, 1974
Appl. No.: 370,756
Filed: Jun. 18, 1973

U.S. Applications:

[62] Division of Ser. No. 102,671, Dec. 30, 1970, Pat. No. 3,806,376.

[30] Foreign Application Priority Data

| | | | |
|---|---|---|---|
| Dec. 30, 1969 | [JP] | Japan | 44-105435 |
| Feb. 26, 1970 | [JP] | Japan | 45-015891 |
| Oct. 9, 1970 | [JP] | Japan | 45-088988 |
| Dec. 1, 1970 | [JP] | Japan | 45-105457 |
| Dec. 1, 1970 | [JP] | Japan | 45-105458 |
| Dec. 1, 1970 | [JP] | Japan | 45-106063 |

[51] Int. Cl.[3] ..... B21B 45/02

[52] U.S. Cl. ..... 72/202; 266/111

[58] Field of Search ..... 72/200, 201, 202, 238, 72/239, 342, 364; 148/12 R, 12 C, 12 D, 156; 266/109, 110, 111

[56] References Cited

U.S. PATENT DOCUMENTS

| | | | |
|---|---|---|---|
| 2,832,711 | 4/1958 | Krahe et al. | 148/156 |
| 2,897,698 | 8/1959 | Van Ormer | 72/202 X |
| 3,443,410 | 5/1969 | Beck | 72/239 |
| 3,552,110 | 7/1970 | Shimizu et al. | 148/12 R |
| 3,607,456 | 9/1971 | Forand | 148/12 R |

OTHER PUBLICATIONS

An Investigation of the Radio Annealing of Sheet Gauge Mild Steel, R. F. Dewsnap, Special Report No. 79, The Iron & Steel Institute, London, 1963; pp. 112-120.

*Primary Examiner*—Ervin M. Combs
*Attorney, Agent, or Firm*—Wenderoth, Lind & Ponack

[57] ABSTRACT

An apparatus for continuous treatment of cold rolled steel sheet. The apparatus has a continuous annealing furnace through which the sheet is continuously passed and which is composed of, in succession, a heating chamber for heating the cold rolled steel sheet to a temperature range of 700° to 900° C. within 2 minutes, a soaking chamber for keeping the sheet in the above temperature range for two minutes or less, a primary cooling chamber for rapidly cooling the sheet from the above temperature range to an overageing at a rate of 5° to 30° C./sec., an overageing chamber for keeping the sheet between 300° to 400° C. for up to eight minutes, and a secondary cooling chamber for cooling the sheet from the above overageing temperature to below 50° C. within 2 minutes. Adjacent the output end of said furnace is apparatus for successively skin pass rolling, levelling and recoiling the sheet from the annealing furnace. The skin pass rolling apparatus has apparatus for replacing the working rolls.

6 Claims, 11 Drawing Figures

APPARATUS FOR CONTINUOUS TREATMENT OF LOW-CARBON COLD-ROLLED STEEL SHEET HAVING EXCELLENT COLD WORKING PROPERTIES

Matter enclosed in heavy brackets [ ] appears in the original patent but forms no part of this reissue specification; matter printed in italics indicates the additions made by reissue.

This application is a division of application Ser. No. 102,671, filed Dec. 30, 1970, *now U.S. Pat. 3,806,376.*

BACKGROUND OF INVENTION

1. Field to which the Invention belongs

The present invention relates to an apparatus for producing low-carbon cold steel sheet having cold workability, particularly press forming quality with use of a continuous annealing system.

The term "a low-carbon steel sheet" used hereinafter designates a steel sheet which is produced by the process of cold rolling and annealing and is for such applications as pressed automobile body parts, rather than an insufficiently annealed steel sheet which is for zinc-plating or tin-plating not subjected to drawing.

2. Prior art

Thin steel sheet for cold working, particularly press forming for use in automobile parts must have among its properties good ductility as well as good drawability and stretchability. To obtain these properties, it is required that the grain size be large enough to prevent the condition known as surface orange peel due to press forming, that the content of dissolved carbon and nitrogen be sufficiently low, that the yield point be low and the elongation be large. To meet these requirements, most of the thin cold rolled steel sheets for such applications have been conventionally produced by box annealing.

However, box annealing requires a longer treatment time (normally more than 60 hours) and thus is undesirable from the standpoint of efficiency. A method for reducing the treatment time recently has been proposed as disclosed in Japanese Patent Publication Sho 43-5995. This method still requires more than 30 hours for the treatment and thus is completely non-competitive with continuous annealing.

Several patents have been published regarding continuous annealing of cold rolled steel sheet for tin-plating. Among these patents, U.S. Pat. No. 2,832,711 is noteworthy. Although this patent discloses relatively soft thin steel sheet treated by a continuous annealing, it discloses or suggests nothing with respect to low-carbon steel sheet having excellent workability which is for pressed autobody parts. Commercial production of such steel sheet has never been carried out.

Reasons why low-carbon cold rolled steel sheet for applications such as pressed automobile body parts has never been produced by means of a continuous annealing are as follows.

It has been generally believed that low yield point, large elongation and Lank-Ford value (r-value) which can be obtained by box annealing can not be obtained unless the speed of the sheet pass is greatly reduced to provide an overaging time for effecting full precipitation of dissolved carbon, or unless the sheet, after continuous annealing for recrystallization is coiled and given enough aging time while the sheet is in a coiled state. For the former case, a treatment furnace for the overaging must be extremely long and thus is not practical for commercial production. In the latter case, the advantages of a continuous treatment as a whole can not be obtained although the annealing is effected continuously.

Further, from the standpoint of equipment, in order to effect recrystallization annealing - overaging - temper rolling - leveling - and recoiling in a continuous manner, it is necessary to rapidly cool the sheet after the overaging to near room temperatures for the subsequent temper rolling, and it is also necessary to perform very quickly the replacement of rolls of the temper rolling mill without interruption of the continuous treatment of the sheet.

No appropriate means has been provided for meeting the above requirements.

GIST OF THE INVENTION

Therefore, one of the objects of the present invention is to provide an apparatus for producing a low-carbon steel sheet having excellent cold workability equal to or better than those obtainable by box annealing by utilization of continuous annealing which has conventionally been believed to be impossible to use in commercial production.

Another object of the present invention is to provide a temper rolling apparatus for continuously and efficiently tempering overaged steel sheet.

Other objects of the present invention will be understood from the following descriptions and the attached figures.

The present invention is applicable to ordinary low-carbon steel, but the most desirable results are obtained by steel compositions as specified hereinafter. Therefore, the following descriptions will be in connection with the specified steel compositions.

Features of the present invention lies in that a low-carbon steel containing less than 0.25 percent preferably less than 0.20 percent, by weight of manganese, and having the following relation among manganese, sulphur and oxygen:

$$0 \leqq [Mn\%] - (\text{Atomic weight of Mn/Atomic weight of O}) \times [O\%] - (\text{Atomic weight of Mn/Atomic weight of S}) \times [S\%] \leqq 0.15$$

is used as a starting material, and subjected to an ordinary hot rolling, coiled at high temperatures above 600° C., then coiled in an ordinary way, and the thus obtained steel sheet is subjected to recrystallization and overaging treatment in a continuous process.

Further features of the present invention lie in improvements in continuous annealing of a steel strip which has been cold rolled in an ordinary way, which improvements comprise passing the steel strip through a heating chamber which can heat the strip to a temperature between 700° to 900° C. within 2 minutes, a soaking furnace which can keep the strip within the temperature range for 2 minutes, a first cooling chamber which can cool the strip from the above temperature range to an overaging temperature between 300° and 450° C. at a rate of 5° to 30° C./sec. (preferably less than 20° C./second), an overaging chamber which can maintain the strip at a temperature between 300° to 450° C. preferably 300° to 400° C. for up to eight, but preferably up to five minutes and a continuous annealing furnace having a secondary rapid cooling chamber which can cool the strip from the above overaging temperature to a temperature below 50° C. preferably to room temperatures within 2 minutes, and then subjecting the strip to temper rolling and leveling and lastly recoiling the strip. Between the continuous annealing furnace and the temper rolling apparatus, an apparatus for a holding of the strip, such as a loop-car, may be provided, and in the overaging zone it is desirable that a hearth roll be used having a sufficiently large diameter that bending stress is not placed on the strip during its passage therethrough.

DETAILED DESCRIPTION OF INVENTION

The present invention will be described in detail with reference to the attached figures.

Figure 1:
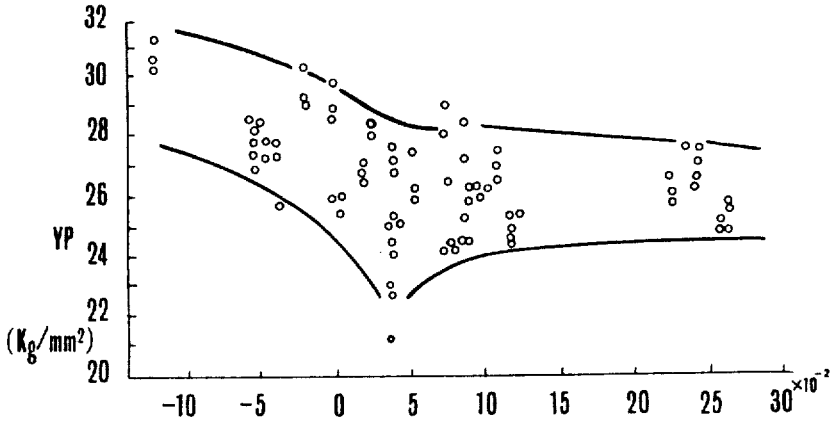
FIG. 1 is a graph showing the relation between the proportions of the constituents in the steel sheet and the yield point.

In the present invention low-carbon steel with a low manganese content is used as starting material.

Generally, a thin steel sheet used for press forming contains about 0.3 percent manganese. Excessive manganese makes it difficult to obtain steel sheet which can be used for press forming by continuous annealing, and in the case of low-carbon rimmed steel sheet, it is necessary to minimize the manganese content in order to obtain good surface qualities of the steel sheet.

The present inventors have found that an appropriate amount of MnS and MnO which is assured by a low manganese content is useful in steel for a continuous annealing treatment. Namely in the present invention, manganese has only to be present in an amount necessary for satisfactorily fixing the sulphur and oxygen which are harmful impurities, and thus manganese has only to be present in a stoichiometric amount or a little more to combine with sulphur and oxygen. That is, the manganese content should be less than 0.25 percent by weight, preferably less than 0.20 percent, and manganese, sulphur and oxygen must be present in amounts which will produce the relationship $0 \leqq K \leqq 0.15$ in the following equation.

$$K=[Mn\%]-(\text{Atomic weight of Mn/Atomic weight of O})\times[O\%]-(\text{Atomic weight of Mn/Atomic weight of S})\times[S\%]=[Mn\%]-(55/16)\times[O\%]-(55/32)\times[S\%]$$

When the relationship $0 \leqq K \leqq 0.15$ is produced in a conventional steel sheet having about 0.3 percent manganese, excessive MnS and MnO are formed and they are harmful.

One of the features of the present invention, therefore, is that the relationship among manganese, sulphur and oxygen is in a specific range, and it is also another feature of the present invention that the hot rolled steel sheet is coiled at high temperatures so as to convert harmful sulfur and oxygen contents into harmless precipitates. The sulphur and oxygen contents cause red-hot embrittlement during the hot rolling and also suppress grain growth during recrystallization annealing. Sulphur inclusions, mainly FeS, which occur during annealing produce many crystal nuclei which prevent grain growth, and the sulfur inclusions, mainly FeS, themselves hinder grain growth. Oxygen also has a similar harmful effect on the grain growth. Therefore by fixing such harmful sulphur and oxygen into harmless forms with manganese, it is possible to reduce the distribution density of sulphur and oxygen so as to provide conditions permitting satisfactory rapid recrystallization.

According to the present invention, the harmful sulphur and oxygen contents are converted into harmless MnS and MnO by the high temperature coiling after hot rolling. As a result it is possible to provide conditions under which the rapid recrystallization is assured. This high temperature coiling also can permit grain growth through the self-annealing action of the hot rolled coil so that the strain energy after the cold rolling can be reduced and the grains can grow in a short time during recrystallization annealing. For the above purposes the coiling temperature should be more than 600° C. However, if the coiling temperature is too high, the local temperature differences in the hot rolled steel sheet will be extremely large and adjustment thereof will be difficult. Thus the upper limit of the coiling temperature should be about 800° C., and a desirable range for the coiling temperature is 675°–800° C.

Conversion of the impurities into harmless form and the grain growth while coiled in the hot state by the high temperature coiling as described above can assure a short time recrystallization during the recrystallization annealing and provide steel materials which are very suitable for a continuous annealing treatment with a heat cycle of rapid heating and cooling. Further, continuous annealing can eliminate sticking of the coiled steel strip which occurs when low-manganese steel strip is box annealed. Thus the continuous annealing can improve the production efficiency as compared with box annealing.

As mentioned above, cold rolled steel sheet having excellent properties can be produced by a process of continuous annealing using a high temperature coiling of hot rolled steel sheet. One illustrative embodiment of a continuous annealing and temper rolling apparatus is shown in FIG. 4.

Figure 4:
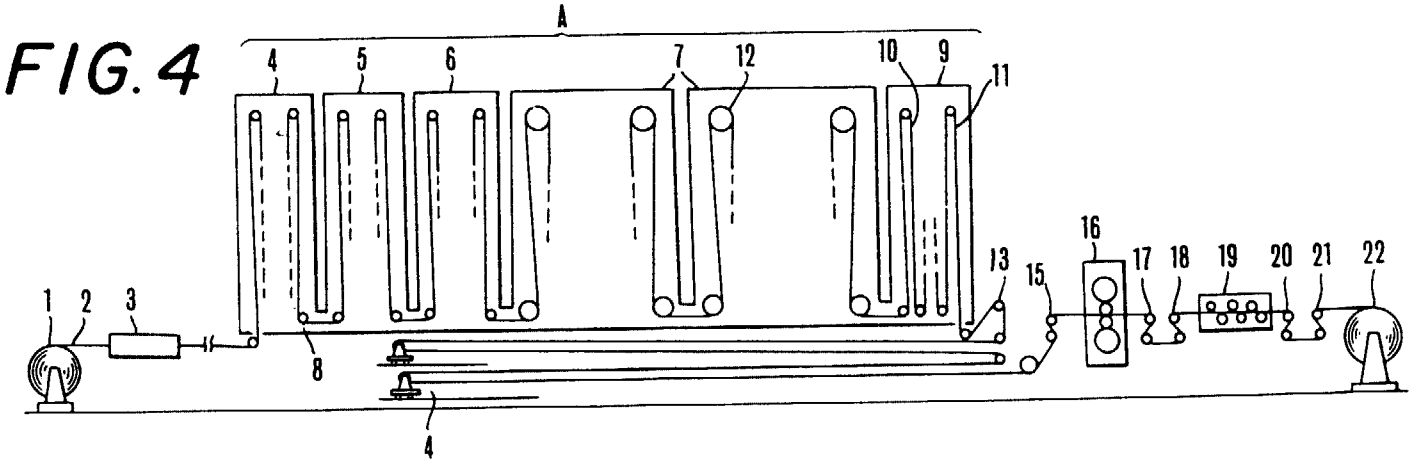
FIG. 4 is a schematic view of an embodiment of the continuous annealing apparatus according to the present invention.

In FIG. 4, the continuous annealing furnace A is composed of the following chambers connected in series:

a. a heating chamber 4 for gas heating with a radiant tube system
b. a soaking chamber 5 with electrical resistance elements for electrical heating
c. a primary cooling chamber 6 with a jet cooler system in which water-cooled air is blown into the chamber to effect a forced cooling
d. an overaging chamber means 7 with electrical heating, and
e. a secondary cooling chamber 9 comprising a secondary cooling section 10 with a jet cooler system of the water-cooled gas type and a third cooling section 11 with a jet cooler system in which the chamber gas cooled by a refrigerator is blown against the sheet steel to effect a forced cooling.

In the figures, 8 is a hearth roller for tensioning and transporting the steel strip 2 up and down as it moves through the chambers, and 12 represents a special hearth roller in the overaging chamber 7.

Figure 5:
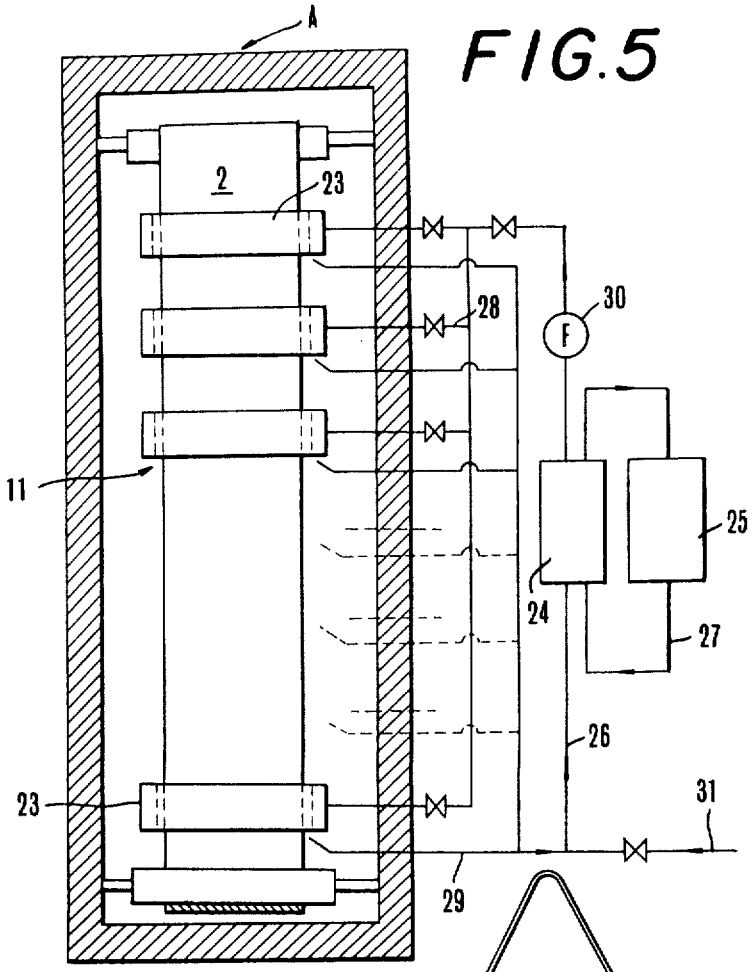
FIG. 5 is a view showing the third cooling section in detail.

The details of the third cooling section 11 are shown in FIG. 5. In this embodiment, eight passes or ten passes of the strip through the secondary cooling chamber 9 are effected in the secondary cooling section 10, and the remaining two passes are effected in the third cooling section 11. 23 designates gas jet chambers, 24 a heat exchanger, 25 a refrigerator, 26 a piping for sending a high-temperature gas into the heat exchanger 24, 27 a piping for circulating refrigerant, 28 a piping for passing forcedly cooled chamber gas under pressure into the gas jet chambers, 29 a piping for recovering waste gas used for cooling, 30 a fan for delivering the refrigerated gas under pressure to respective gas jet chambers, 31 a piping for gas supply.

It has been found very effective for reducing the stress hardening of steel strip to increase the radius of curvature of the steel strip at the turning point *at which the path of the steel sheet reverses between passes*, for example, by increasing the diameter *D* of the hearth roller in the overaging zone.

When the diameter of the hearth roller is small, the bending stress on steel strip is not negligible at the turning point and thus an increase in elongation due to overaging is suppressed by stress age hardening under stress, and when such bending stress is large, the steel strip hardens at the time of bending, rather than before the overaging treatment.

Since it is desirable that no such stress be given to the steel strip, the present inventor investigated the ratio of the sheet thickness to the bending radius which is critical for avoiding the remarkable hardening of the strip due to the stress hardening. As a result, the following relation has been established:

$$d/R\,[=]\leqq 2.02\times 10^{-3}-1.05\times 10^{-3}\log(t+1)$$

in which d is the thickness in millimeters of the steel strip, R is the bending radius in millimeters (the radius of a circular arc around the turning point of the strip *which arc is defined by the periphery of the hearth roller*), t is the time in minutes during which the stress occurs (the time it takes a point on the strip to travel along the circular arc).

According to the above, if the time during which the stress occurs in the strip is shortened, the critical value of d/R which will not cause hardening of the steel strip due to the stress hardening [becoming] *becomes* higher.

For example, if the time during which the bending stress occurs in the strip is 1 minute, it is necessary to use a hearth roller having a diameter more than 1,200 times the strip thickness.

The turning point of the steel strip may be formed by several rolls having smaller diameters instead of a single hearth roll, and therefore the radius R at the turning point of the steel strip in the present invention should be *half* the diameter *D* of the hearth roller or its equivalent.

At the entrance of the continuous annealing furnace A is a strip surface cleaning apparatus 3, and at its outlet is a loop car 14 to which the steel strip is lead around a bending roll 13. 15 and 17 are respectively bridle rolls positioned before and after the skin pass mill 16, and 18 and 20 are respectively bridle rolls positioned before and after the leveler 19, and 21 is a bridle roll positioned ahead of the coiling reel 22.

Figure 6:
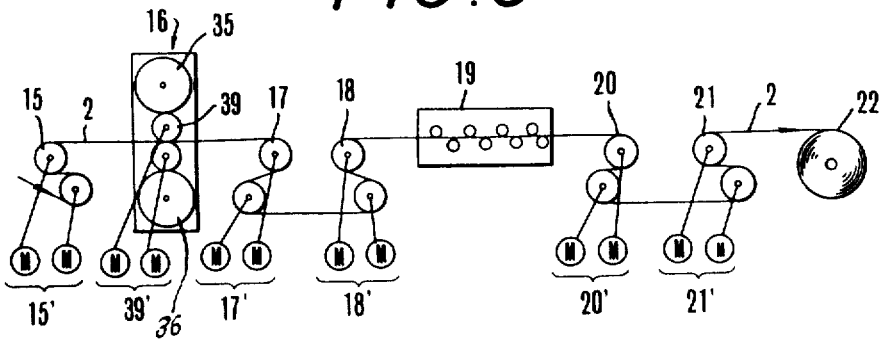
FIG. 6 is a schematic flow-sheet showing the production line subsequent to the continuous annealing furnace.

Details of the arrangement of apparatus subsequent to the skin pass mill 16 are shown in FIG. 6.

In FIG. 6, 15' and 17' are motors for driving the bridle rolls 15 and 17, and by adjusting the rotation speed of the rolls a desired tension is given to the steel strip at the temper mill 16. 39 are the work rolls of the temper mill 16, which are driven by motors 39. Instead, back-up rolls 35 and 36 may be driven for the same purpose. 18' and 20' are motors for driving the bridle rolls 18 and 20, which serve to adjust the tension of the steel strip, and 21' are motors for driving the bridle rolls 21, which serve to adjust the coiling tension.

Next, the operation of the present invention will be described.

In FIG. 4, the cold rolled steel strip 2 uncoiled from the coil 1 is surface cleaned by the surface cleaning apparatus 3 and led to the continuous annealing furnace A. Then the steel strip 2 is first introduced to the heating chamber 4 where the strip is heated at temperatures between 700° and 900° C. The heating up to the above temperature range is effected within 2 minutes. If the heating rate, however, is too rapid, grains with unfavorable orientations increase and thus the Lank-Ford value (r value) which is an index of press formability, particularly drawability, is lowered, and the number of recrystallization nuclei increase to make the grain size fine so that the yield point rises.

Then the strip passes through the soaking chamber 5 in which the strip is kept at the above temperature range of 700° to 900° C. for up to 2 minutes. The above time for keeping the strip at the temperature has a certain relation with the heating temperature. With a higher temperature only a short time of soaking or no soaking is required, while with a lower temperature, a relatively long time of soaking is required. Namely, in the soaking chamber 5, recrystallization and grain growth of the steel strip must be effected, and the soaking time is appropriately adjusted depending on the temperature.

The strip coming out of the soaking chamber 5 is immediately led to the primary cooling chamber 6 where the strip is rapidly cooled to the overaging temperature. The cooling may be done for example with a jet cooling system. If the cooling rate is slow, the subsequent overaging treatment does not attain its full effects. Namely it is advantageous for attaining satisfactory precipitation of carbon during the overaging to maintain the carbon in a supersaturated solid solution before the overaging, and for this purpose, it is preferable to cool the strip at a cooling rate of 5° to 30° C. per second, more preferably less than 20° C. per second.

The strip conditioned as above passes through the overaging chamber 7 for up to 8, but preferably up to 5, minutes where the strip is heated to 300°-450° C., and the carbon in the strip fully precipitates and is fixed as carbide to achieve sufficient press formability and make the strip sufficiently non-aging.

Above 450° C. the properties of the steel strip, such as elongation and yield point, deteriorate although the overaging is effected. While below 300° C., a greater length of the chamber is required and thus an increased cost of equipment results.

More than five minutes of overaging will need a greater length of the chamber, thus inhibiting commercial production, but less than five minutes of overaging is enough for desired results if the temperature is within the above range.

The relation between the temperature and the time is similar to that for soaking, i.e., with a higher temperature a shorter-time overaging is desirable while with a lower temperature a longer-time overaging is desirable.

The strip thus overaged is cooled below 50° C. for up to 2 minutes in the secondary cooling chamber 9. This cooling has an important effect on the continuous system of production. Namely if the strip can be cooled rapidly to near the room temperature, it is possible to skin pass the strip immediately, thus greatly improving the production efficiency.

According to the present invention, the strip is cooled to near 100° C. from the overaging temperature in the secondary cooling section 10, and then in the third cooling section 11 the strip is rapidly cooled to the room temperature using gas recirculated to the chamber after being cooled by a refrigerator. The cooling rate becomes slower at the lower temperature. However, according to the present invention the strip can easily be cooled to about 40° C. in a short time.

In FIG. 5, the gas passes through the pipe 26 to the heat exchanger 24 where the gas is rapidly cooled by heat-exchange with the refrigerant coming from the refrigerator 25 through the circulation pipe 27, and is delivered to respective gas jet chamber 23 by the fan 30. The gas jet chambers 23 are arranged along the strip path so that the cooled gas is directed uniformly onto the strip surface to rapidly cool the strip down to the room temperature. The gas is recovered through the gas recovery pipe 29 and recirculated.

The strip coming out of the cooling chamber 9 is stored under tension in the loop-car 14 after passing over the bending roll 13 and then is led to the skin pass mill 16.

Subsequently, the strip is subjected to temper rolling. In the conventional practice, a continuous system for skin pass rolling the steel strip continuously from the overaging treatment has not been used. This is due to the fact that batch type annealing and overaging treatments are necessary to obtain sufficiently good mechanical properties in the steel strip and also due to the fact that changing the rolls of the skin pass mill takes a long time, and this, in a continuous system, would necessitate stopping operation of the system so that, it has been believed, irregular quality and deterioration of the mechanical properties of the steel strip would result. Another reason for the above is that no appropriate method has been available for cooling after the overaging in a continuous annealing treatment.

According to the present invention, firstly a specific material is provided to overcome the first problem, and a steel strip "storing" portion 14 is provided between the overaging zone and the skin pass mill to overcome the second problem. Secondly, a rapid replacement system of the cassette type, as described in detail later, is provided to carry out rapid roll replacement; and thirdly the stepwise cooling as described above is used to eliminate the third problem.

Another feature of the present invention is that the skin pass mill 16 and the leveler 19 are arranged on the same line with each other.

Still another feature of the present invention is that the bridle rolls 17 and 18 are provided between the skin pass mill 16 and leveler 19 to provide two tension systems: the skin-pass tension section and the leveler tension system.

Referring to FIG. 6, in the skin-pass tension system, the rotation speed of the bridle rolls 15 and 17, namely the load on the driving motors 15' and 17' is adjusted so as to give 2 kg/mm$^2$ of back tension, for example, and to give 3 kg/mm$^2$ of front tension, for example, to the skin pass mill 16, to effect skin pass rolling by rotating the work rolls. In the leveler tension system, the relative speed of the bridle rolls 18 and 20 is adjusted so as to give, for example, 10 kg/mm$^2$ of front and back tension to the leveler.

In this way, according to the present invention, the skin pass rolling and the tension leveling, which have been conventionally used for improving the shape and qualities of the annealed steel strip, are connected in the same line, and on the basis of the fact that the tension in the skin pass rolling produces delicate effects on the steel strip, the tension system in the skin pass mill and that in the tension leveler are separated to permit tension adjustment in each of the systems individually.

As mentioned above, the steel strip, after the continuous annealing, is immediately subjected to the skin pass and leveler to improve and correct the properties and shape, and is then coiled continuously. For this, a rapid replacement of the work rolls in the skin pass mill is required.

Figure 8:
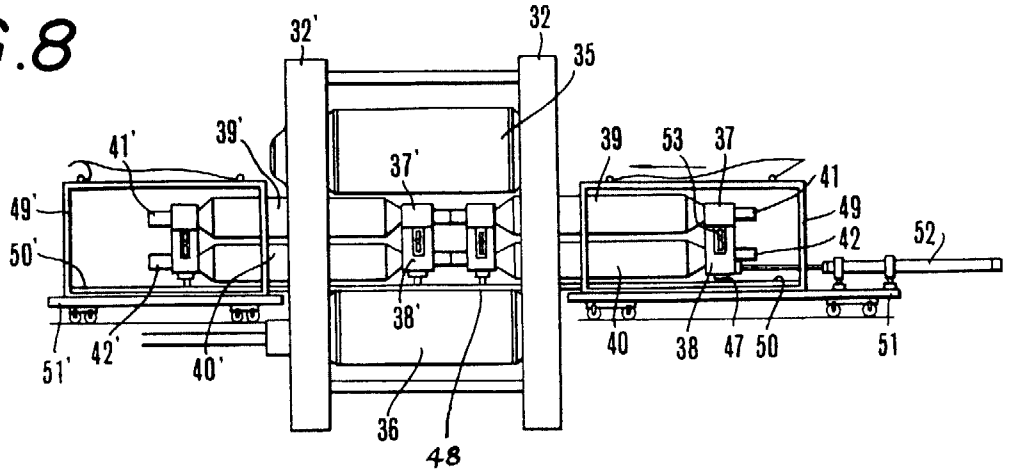
FIGS. 7 to 11 are illustrative views showing the manner of carrying out rapid replacement of skin-pass mill rolls.
Figure 9:
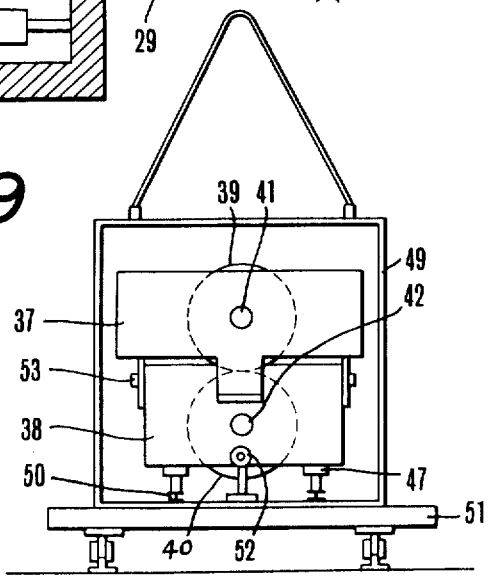
Figure 7:
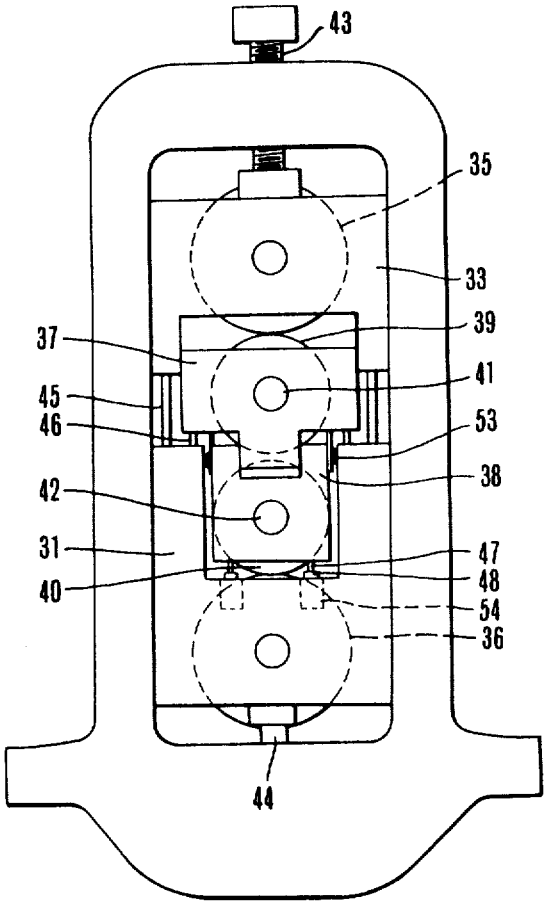

One illustrative example of the rapid replacement means is shown in FIGS. 7 to 9.

In these figures, the skin pass mill 16 comprises stand housings 32 and 32' back-up rolls 35 and 36, back-up roll chocks 33 and 31, work rolls 39 and 40 mounted on shafts 41 and 42, and work roll chocks 37 and 38. 43 is a screw for adjusting the roll gap, 44 is a pressure cylinder for giving a predetermined upward pressure to the roll chock 31, 45 is a cylinder for balancing the rolls, pushing the roll chock 33 upward. 46 is a cylinder for balancing the rolls, pushing the roll chock 37 upward. At the lower portion of the roll chock 38 are provided wheels 47 and rails 48 are correspondingly provided on the roll chock 34. Cylinders 54 for lifting the rail are provided in the roll chock 31. 53 is a connecting member for connecting the upper and lower roll chocks 37 and 38 and the connecting member is provided with a longitudinal oblong opening for permitting the up-down movement of the chocks.

Now referring to the removing apparatus, 49 and 49' are roll support frames for a replaced roll, on the bottom of which is provided rails 50 corresponding to the wheels 47, and 51 and 51' are trucks for mounting roll support frames 49 and 49', and the truck 51 is provided with a pusher 52. The truck 51 is arranged on the working side of the roll mill and the truck 51' is arranged on the side from which the back-up rolls are driven.

During the operation of the skin pass mill, the roll gap is adjusted by means of the screw 43 and then a predetermined pressure is given to the cylinder 44 to push the roll chock 31 up together with the roll chock 38. Further, the roll chocks 33 and 37 are pushed up with a predetermined pressure by means of the cylinders 45 and 46 applied to the roll chock 33 to provide a roll gap so that the work piece can be rolled to a desired thickness.

Now referring to FIG. 8, when the used work rolls 39' and 40' are replaced, the roll support frame 49 carrying the new work rolls 39 and 40 is mounted on the truck 51 arranged on the roll working side. Of course, the support frame must be in place so that the rails 50 of the support frame and the rails 48 of the roll chock 31 are aligned.

Meanwhile, the pressure of the cylinder 46 for the roll balancing is reduced to lower the upper work roll 39 to support the upper work roll on the lower work roll so that the upper and lower work rolls come together, and the rails 48 are lifted up by the cylinders 54 to push the upper and lower work rolls 39 and 40 upwards by means of the wheels 47 to disengage the lower work roll from the lower back-up roll to allow the work rolls 39 and 40 to move along the rails 47.

On the roll driving side of the mill, the roll support frame 49' is placed on the truck 51' just as on the mill operation side. The rails 50' are positioned so as to be aligned with the rails 48.

When the above perparatory steps are completed, the lower roll is pressed by the pusher 52 provided on the truck 51. As the shafts 41 and 42 of the upper and lower work rolls 39' and 40' in the housing and the shafts 41 and 42 of the new upper and lower work rolls 39 and 40 are aligned, the end surfaces of the shafts contact each other as the upper and lower work rolls 39 and 40 move, and the upper and lower work rolls 39' and 40' are pushed out into the roll support frame 49' which has been positioned on the roll driving side.

When the new upper and lower work rolls 39 and 40 are in place in the housing, the used work rolls 39' and 40' are contained in the support frame 40' and thus ready for movement to the roll repair yard.

Figure 10:
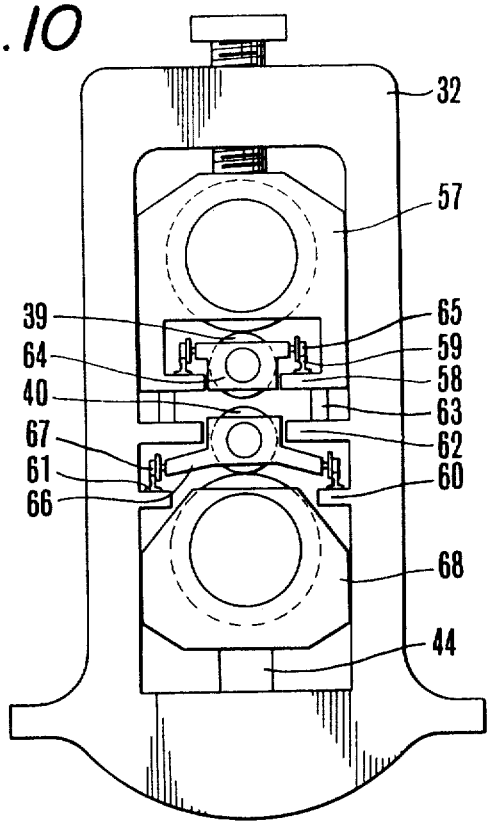
Figure 11:
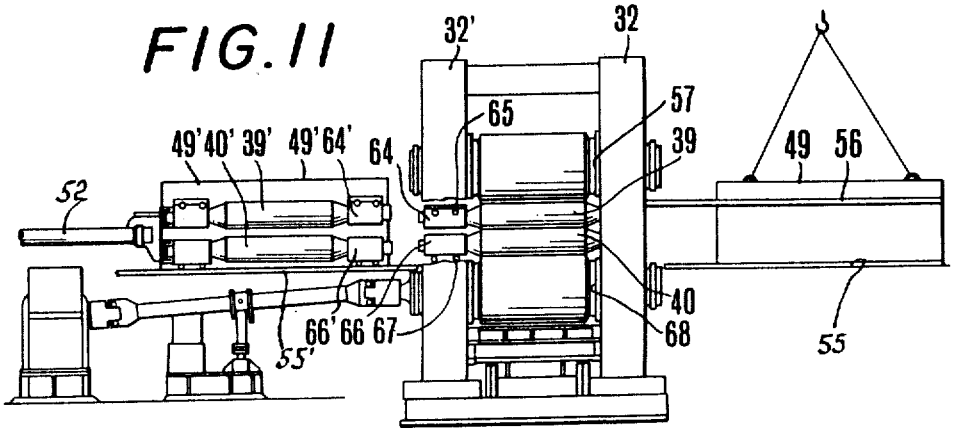

The roll replacement apparatus of the present invention may be modified. For example as shown in FIG. 10 and FIG. 11, rails 55, 56, 55' and a rail corresponding to rail 56 above and below on the support frames 49 and 49', and rails 59 and 61 corresponding to the above rails are provided on the projection 60 provided in the window of the roll housing and on the projection 58 of the chock 57 for the upper back-up roll. The back-up roll chock 57 is pushed up by the pressure of the balance cylinders 63 provided on the projection 62 in the window of the roll housing to allow the wheel 65 of the upper work roll chock 64 to rest on the rail 59, and at the same time the work roll 40 is brought down by reducing the pressure of the pressure cylinder 44 to allow the sheel 67 of the roll check 66 for the lower work roll 40 to rest on the rail 61 in the housing to push out the roll chocks 64' and 66' mounted respectively on the upper and lower rails on the roll support frame 49' and to replace the work rolls 39 and 40 in the housing.

The pusher 52 may be replaced for example by a cylinder provided in the housing, the end of which cylinder engages with the work roll chock in roll support frame and pulls the chock into the housing.

According to the present invention, good effects of shape correction as well as satisfactory skin pass effects can be attained in the same apparatus without the deterioration of the steel strip so that soft steel strip for press forming and other uses in which the mechanical properties and shape are regarded as important can be obtained without difficulty. In the conventional process, the skin pass and shape correction are simultaneously effected by a skin pass rolling mill. On the other hand, in the present invention, the skin pass rolling mill is assigned only the task of skin pass rolling, so that the housing or rolls of the skin pass rolling mill can be made smaller so that the production cost can be greatly reduced.

A conventional skin pass rolling mill is limited to a large capacity of 50,000 to 100,000 tons per month and thus is uneconomical except for a large demand. On the other hand, a small skin pass rolling mill is very economical because the capacity of the rolling mill can be increased depending on the demand.

Further according to the present invention, a side trimmer, an oiler and so on can be provided and thus steps subsequent to skin pass rolling mill can be arranged in a single line, and thus advantages such as improved mechanical properties, rationalization of man power and reduction of semi-finished products can be obtained.

Properties of steel sheets produced by the process and apparatus according to the invention will be described with reference to the attached figures.

FIG. 1 shows the relation between the K value (see first formula above) and the yield point (YP). Materials were prepared from a rimmed steel having a chemical composition as follows: C: 0.03 to 0.05%, Mn: 0.14 to 0.31%, S: 0.007 to 0.022%, O: 0.010 to 0.062% with the balance being substantially Fe. Sheet of this composition was coiled at a temperature between 700° to 730° C. after hot rolling and then cold rolled to sheet having a final thickness of 0.8 mm. The cold rolled steel strip was annealed in a continuous annealing system in which the strip was held at 700° C. for 1.5 minutes and then to an overaging treatment at 350° C. for 5 minutes.

From FIG. 1, it is seen that when K is between 0 and 0.1 a very low yield point is obtained, and when K is above 0.2 it is saturated.

Figure 2:
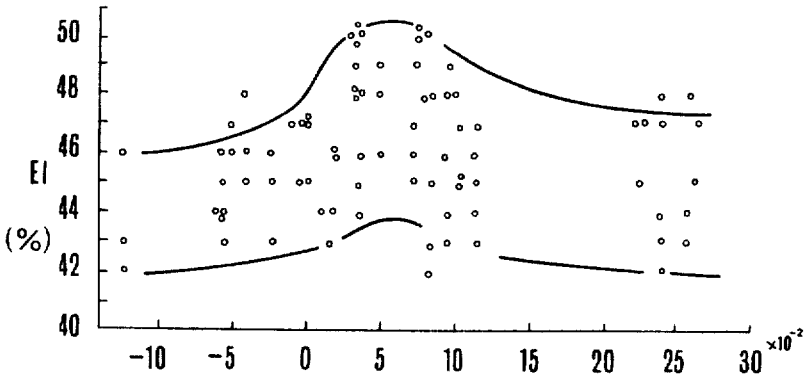
FIG. 2 is a graph showing the relation between the proportions of the constituents in the steel sheet and the elongation.

FIG. 2 shows elongation (E1) of the same material as in FIG. 1, and it is seen that an excellent E1% is obtained when K is 0 to 0.15.

Figure 3:
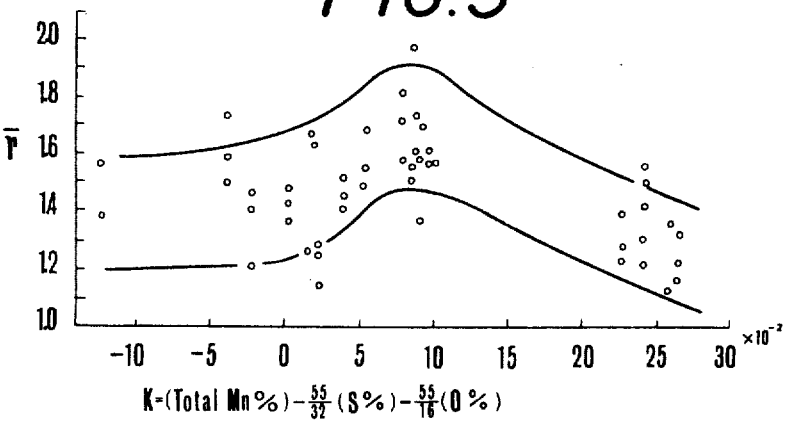
FIG. 3 is a graph showing the relation between the proportions of the constituents in the steel sheet and the average Lank-Ford value.

FIG. 3 shows r values for the same material as in FIG. 1, and it is seen that when K is between 0.04 to 0.15, an r value more than 1.7, which is required for a super deep drawing quality, is obtained, and overall when K is less than 0 or more than 0.2, a satisfactory r value is not obtained. Therefore, when K is between 0 to 0.15 the properties usually required for good press formability are present. Also from these figures, it is seen that an exceptional lowering of the yield point and an exceptional increase in elongation and r value are attained when $0 \leqq K \leqq 0.05$.

The steel according to the present invention may be produced in a convertor or other steel making furnaces, and subjected to ingot making, cogging, hot rolling, then cold rolling, continuous annealing (including overaging) and if necessary temper rolling.

The conditions of the above processing steps may be selected within a wide range as long as the specified steel composition range and the specified coiling temperature range of the hot rolled steel sheet are maintained.

The carbon content of the steel in the present invention may be similar to ordinary low-carbon cold rolled steel, and if a lower carbon content is required, this requirement can be easily satisfied by vacuum degassing the molten steel or decarburizing the steel during the annealing.

The present invention will be more clearly understood from the following examples.

EXAMPLE 1

A hot rolled sheet coil was prepared by forming molten steel from a convertor into an ingot, cogging and hot rolling in an ordinary way and coiling at temperatures between 700° to 730° C. and the thus obtained hot rolled sheet coil was left to cool to room temperatures.

This hot rolled sheet was further subjected to ordinary cold rolling to a final thickness (0.7 mm), then to a recrystallization annealing in which the sheet was maintained at 700° C. for 1 minute and cooled and subsequently to an overaging treatment in which the sheet was maintained at 350° C. for 2 minutes in a continuous annealing process and lastly was subjected to skin pass rolling with 1 to 1.5 percent reduction.

The steel composition and properties are shown in Table 1. For comparison the composition and properties of steel sheet having a large K value are also shown.

As clearly seen from Table 1, the steel of the present invention has better mechanical properties than the standard steel produced by a conventional method.

TABLE 1

STEEL COMPOSITIONS AND PROPERTIES

| | Inventive steel (0.7 mm thick) | Comparative steel (0.7 mm. thick) |
|---|---|---|
| Compositions: | | |
| C (percent) | 0.04 | 0.04. |
| Mn | 0.19 | 0.30. |
| S | 0.012 | 0.013. |
| O | 0.044 | 0.027. |
| K value* | 0.02 | 0.26. |
| Coiling temperature (°C.) | 700–730 | 530–550. |
| Annealing temperature (continous) | 700° C. × 1 min., plus 350° C. × 2 min. | 700° C. × 1 min. plus 350° C. × 2 min. |
| Temper rolling (percent) | 1.0–1.5 | 1.0–1.5. |
| Immediately after temper rolling: | | |
| Yield point (kg/min.$^2$) | 19.2 | 22.2. |
| Tensile strength (inches) | 32.0 | 34.9. |
| Elongation (percent) | 46 | 43. |
| $\bar{r}$ | 1.58 | 1.13. |
| Conical cup value (mm.) | 26.03 | 27.2. |
| Erichson value (mm.) | 10.7 | 10.4. |
| Yield point elongation, percent | 0 | 0. |
| After aging: | | |
| Yield point elongation, percent (100° C. × 60 mm.) | 3.3 | 5.9. |
| Room temperature × 3 days | 0 | 1.1. |

$$*K \text{ value} = [\text{Mn, percent}] - \frac{\text{Atomic weight of Mn}}{\text{Atomic weight of O}} \times [\text{O }\%] - \frac{\text{Atomic weight of Mn}}{\text{Atomic weight of S}} \times [\text{S }\%]$$

EXAMPLE 2

The steel according to the invention having a composition as set forth in Table 2 was produced in a convertor, and after ordinary ingot making was treated under the conditions set forth in Table 3. The results also are set forth in Table 3. The cold rolling in this example was effected in an ordinary way.

It is clear from Table 3 the inventive steel has excellent properties.

TABLE 2

| Steel Compositions % | | | | | | |
|---|---|---|---|---|---|---|
| C | Si | Mn | P | S | O | K value |
| 0.07 | 0.01 | 0.22 | 0.004 | 0.011 | 0.051 | 0.012 |

TABLE 3

TREATING CONDITIONS AND MECHANICAL PROPERTIES

| | Sheet thickness, 0.7 mm. | Sheet thickness, 0.8 mm. |
|---|---|---|
| Hot rolling finishing temperature (°C.) | 950 | 950 |
| Coiling temperature (°C.) | 710 | 710 |
| Thickness of hot rolled sheet, mm | 2.5 | 2.5 |
| Thickness of cold rolled sheet, mm | 0.7 | 0.8 |
| Continuous annealing: | | |
| Heating temperature (°C.) | 700 | 800 |
| Primary cooling (°C./sec.) | 21 | 20.0 |

TABLE 3-continued

TREATING CONDITIONS AND MECHANICAL PROPERTIES

| | Sheet thickness, 0.7 mm. | Sheet thickness, 0.8 mm. |
|---|---|---|
| Overaging, °C. × min | 350 × 2 | 350 × 2 |
| Secondary cooling: | | |
| First step 350→100° C. | [1] 2.9 | [1] 2.8 |
| Second step 100→50° C. | [1] 2.1 | [1] 2.0 |
| Skin pass (percent) | 1.0 | 1.0 |
| Mechanical properties: | | |
| Yield point (kg./mm.$^2$) | 18.7 | 19.7 |
| Tensile strength (inches) | 33.0 | 33.3 |
| Elongation (percent) | 44.5 | 44.0 |
| Erichsen value (mm.) | 10.5 | 10.6 |
| Hardness Rockwell B | 42 | 44 |
| $\bar{r}$ | 1.53 | 1.59 |

[1] °C./sec.

What is claimed is:

1. An apparatus for continuous treatment of cold rolled steel sheet comprising a continuous annealing furnace through which the sheet is continuously passed and which is composed of, in succession, a heating chamber for heating the cold rolled steel sheet to a temperature range of 700° C. to 900° C. within 2 minutes, a soaking chamber for keeping the sheet in the above temperature range for two minutes or less, a primary cooling chamber for rapidly cooling the sheet from the above temperature range to an overageing temperature at a rate of 5° to 30° C./sec., an overageing chamber for keeping the sheet between 300° to 400° C. for up to 8 minutes, *said overageing chamber having a hearth roll therein over which the steel sheet runs for reversing the path of the steel sheet, said roll having a diameter D according to the following formula:*

$$d/R \leqq 2.02\times10^{-3} - 1.05\times10^{-3} \log (t+1)$$

*in which d is the thickness in millimeters of the steel sheet, R is the bending radius in millimeters and is equal to*

*one-half D, and t is the time in minutes during which stress is given to the sheet,* and a secondary cooling chamber for cooling the sheet from the above overageing temperature to below 50° C. within 2 minutes, and means adjacent the output end of said furnace for successively skin pass rolling, levelling and recoiling the sheet from the annealing furnace.

2. An apparatus according to claim 1 in which the primary cooling chamber has a jet cooling system for rapid cooling of the sheet from a temperature range of 700° to 900° C. to a temperature range of 300° to 450° C. at a rate of less than 20° C./sec.

3. An apparatus according to claim 1 in which the secondary cooling chamber has gas jet means therein for jetting water cooled gas for cooling the sheet from the overageing temperature to 100° C. and has further gas jet means for further cooling the sheet below 100° C., and gas supply means coupled to said further gas jet means and including gas refrigerating means for regrigerating the gas supplied to said further gas jet means.

4. An apparatus according to claim 1 in which [the overageing chamber has a hearth roll therein over which the steel sheet runs which has a roll diameter which satisfies the following formula:

$$d/R \leqq 2.02 \times 10^{-3} - 1.05 \times 10^{-3} \log (t+1)$$

in which d is the thickness in millimeters of the steel sheet, R is the bending radius in millimeters and t is the time in minutes during which stress is given to the sheet, and] the secondary cooling chamber has in series gas jet means for blowing gas cooled by cooling water and gas jet means for blowing gas cooled by refrigeration.

5. An apparatus according to claim 1 in which the skin pass rolling means is a skin pass rolling mill having a pair of work rolls and a pair of back-up rolls backing up said work rolls, and driving means coupled to one of said pair of rolls; and bridle rolls between said skin pass rolling mill and said levelling means for continuous feeding of the steel sheet from the skin pass rolling mill to said levelling means.

6. An apparatus according to claim 1 in which said skin pass rolling means comprises a skin pass rolling mill having a housing and working rolls housed in said housing, a support frame for supporting a replacement working roll, a truck arranged on one side of the roll mill on which said support frame is positioned, a means on said support frame for placing the replacement working roll in coaxial alignment with a used roll in the rolling mill, a means on said truck for pushing the replacement roll toward the housing to thereby push the used roll out of the housing, another truck arranged on the opposite side of the rolling mill from said firstmentioned truck, and a further support frame on said further truck for receiving and holding the used roll when it is pushed thereonto from the housing.

* * * * *